(12) United States Patent
Soyannwo et al.

(10) Patent No.: US 9,759,994 B1
(45) Date of Patent: Sep. 12, 2017

(54) AUTOMATIC PROJECTION FOCUSING

(71) Applicant: Amazon Technologies, Inc., Seattle, WA (US)

(72) Inventors: Olusanya Temitope Soyannwo, Cupertino, CA (US); Renwei Yan, Sunnyvale, CA (US); Edward Dietz Crump, Santa Cruz, CA (US); Weijian Wang, Cupertino, CA (US); Samuel Henry Chang, San Jose, CA (US); Ning Yao, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/949,276

(22) Filed: Nov. 23, 2015

Related U.S. Application Data

(62) Division of application No. 13/612,173, filed on Sep. 12, 2012, now Pat. No. 9,197,870.

(51) Int. Cl.
*G03B 21/53* (2006.01)
*G02B 27/01* (2006.01)
*H04N 9/31* (2006.01)
*G06T 19/00* (2011.01)

(52) U.S. Cl.
CPC ......... *G03B 21/53* (2013.01); *G02B 27/0101* (2013.01); *G06T 19/006* (2013.01); *H04N 9/3188* (2013.01); *H04N 9/3194* (2013.01); *G02B 2027/014* (2013.01); *G02B 2027/0138* (2013.01)

(58) Field of Classification Search
CPC .. G03B 21/006; G03B 21/147; H04N 9/3185; H04N 9/3194; H04N 9/3197; A63F 13/00; A63F 13/06
See application file for complete search history.

(56) References Cited

U.S. PATENT DOCUMENTS

| 6,764,185 | B1 | 7/2004 | Beardsley et al. |
| 6,860,604 | B1 | 3/2005 | Vlahos |
| 7,686,460 | B2 | 3/2010 | Holmgren et al. |
| 8,144,118 | B2 * | 3/2012 | Hildreth ................. A63F 13/00 345/156 |
| 8,698,873 | B2 | 4/2014 | Barrus |

(Continued)

FOREIGN PATENT DOCUMENTS

WO    WO2011088053    7/2011

OTHER PUBLICATIONS

Office Action for U.S. Appl. No. 13/612,173, mailed on Mar. 19, 2015, Olusanya T. Soyannwo, "Automatic Projection Focusing", 6 pages.

(Continued)

*Primary Examiner* — Sultan Chowdhury
(74) *Attorney, Agent, or Firm* — Lee & Hayes, PLLC

(57) ABSTRACT

Techniques are described for performing automatic focusing of a projected image on a mobile projection surface. Specific regions of the projected image are identified that are likely to be desired to stay in optimal focus, and attributes of those specific regions, such as sharpness and contrast, can be used to determine the need to refocus the image. Advanced knowledge of the image data being projected can be utilized to determine the specific regions of the projected image that require monitoring for optimal focusing.

20 Claims, 6 Drawing Sheets

(56) References Cited

U.S. PATENT DOCUMENTS

| | | |
|---|---|---|
| 2004/0102247 A1 | 5/2004 | Smoot et al. |
| 2004/0165154 A1 | 8/2004 | Kobori et al. |
| 2005/0094112 A1* | 5/2005 | Eguchi .................. H04N 9/317 353/111 |
| 2006/0280360 A1* | 12/2006 | Holub ...................... G01J 3/02 382/162 |
| 2007/0273842 A1 | 11/2007 | Morrison et al. |
| 2007/0274563 A1 | 11/2007 | Jung et al. |
| 2008/0259289 A1* | 10/2008 | Nozaki .................. G03B 17/00 353/70 |
| 2009/0096994 A1* | 4/2009 | Smits .................. G02B 26/101 353/30 |
| 2012/0223885 A1 | 9/2012 | Perez |
| 2014/0035901 A1 | 2/2014 | Chen et al. |

OTHER PUBLICATIONS

Office action for U.S. Appl. No. 13/612,173, mailed on Sep. 22, 2014, Soyannwo et al., "Automatic Projection Focusing", 9 pages.
Pinhanez, "The Everywhere Displays Projector: A Device to Create Ubiquitous Graphical Interfaces", IBM Thomas Watson Research Center, Ubicomp 2001, 18 pages.

* cited by examiner

AUTOMATIC PROJECTION FOCUSING

RELATED APPLICATION

This application claims priority to U.S. Non-Provisional application Ser. No. 13/612,173 to Soyannwo et al., entitled "Automatic Projection Focusing," filed Sep. 12, 2012, the contents of which are incorporated herein by reference in their entirety.

BACKGROUND

Existing projector systems typically project a dynamic and/or static image onto a surface and focus the image based autofocus algorithms that monitor one specific point or region of the image, e.g. a dead center of the projected image. This type of autofocus works sufficiently because the projection source is not expected to continuously change relative to the projection surface. However, in the case of a highly mobile projection surface or source, performing an autofocus without adversely impacting user experience becomes more difficult.

With the projector or surface reflecting the projected image in motion, the projected image may become distorted in any of three dimensions, and also may be projected on a surface at various angles. Moreover, the projected image typically has regions of interest to the viewer that might not be within the region of the image that the static autofocus is monitoring. Consequently, the use of an autofocus on a static region within the projected image may not adequately compensate for the motion of either the projector or surface, and does not necessarily keep the region of most likely interest to the viewer of the image in focus.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes systems and techniques for performing the automatic focusing of a series of projected images where either the projector, the surface reflecting the projected image, or both, are potentially mobile. Specific regions of the projected images are identified that are not in motion relative to other portions of the images, and attributes of those specific regions, such as sharpness and contrast, can be used to determine the need to refocus the image.

In one embodiment, the system includes one or more processors, and one or more sensors communicatively coupled to the one or more processors, with the sensors including at least a camera. The system also includes a projector, and causes the projector to project the series of images in the form of a light pattern into an environment such that the light pattern is detectable by the camera, and then the system determines at least one specific region in the projected light pattern that is to be monitored for automatically focusing the light pattern. The system then monitors the at least one specific region in the projected light pattern for a predetermined threshold of a change in an image attribute, and refocuses the light pattern based upon the predetermined threshold being met.

In one embodiment, the system determines the region(s) of interest in the projected light pattern based upon review of the image data that comprises the projected light pattern, and can do so before the light pattern is projected or concurrently therewith. For instance, a camera can identity a portion of the projected light pattern that has not changed greatly over a number of frames and can use this portion to determine whether the projector should be focused. In another example, this determination of can be based upon motion prediction within the image data that comprises the projected light pattern. That is, the system may analyze the image date that is to be projected to determine which portion(s) of the projected light pattern can be used to determined whether the projected should be refocused due to a changed location of a display medium. By selecting areas of the light pattern comprising the series of projected images that are generally not in motion over a number of image frames, the camera can more easily identify any changes in focus in those areas.

Example Environments

Figure 1:
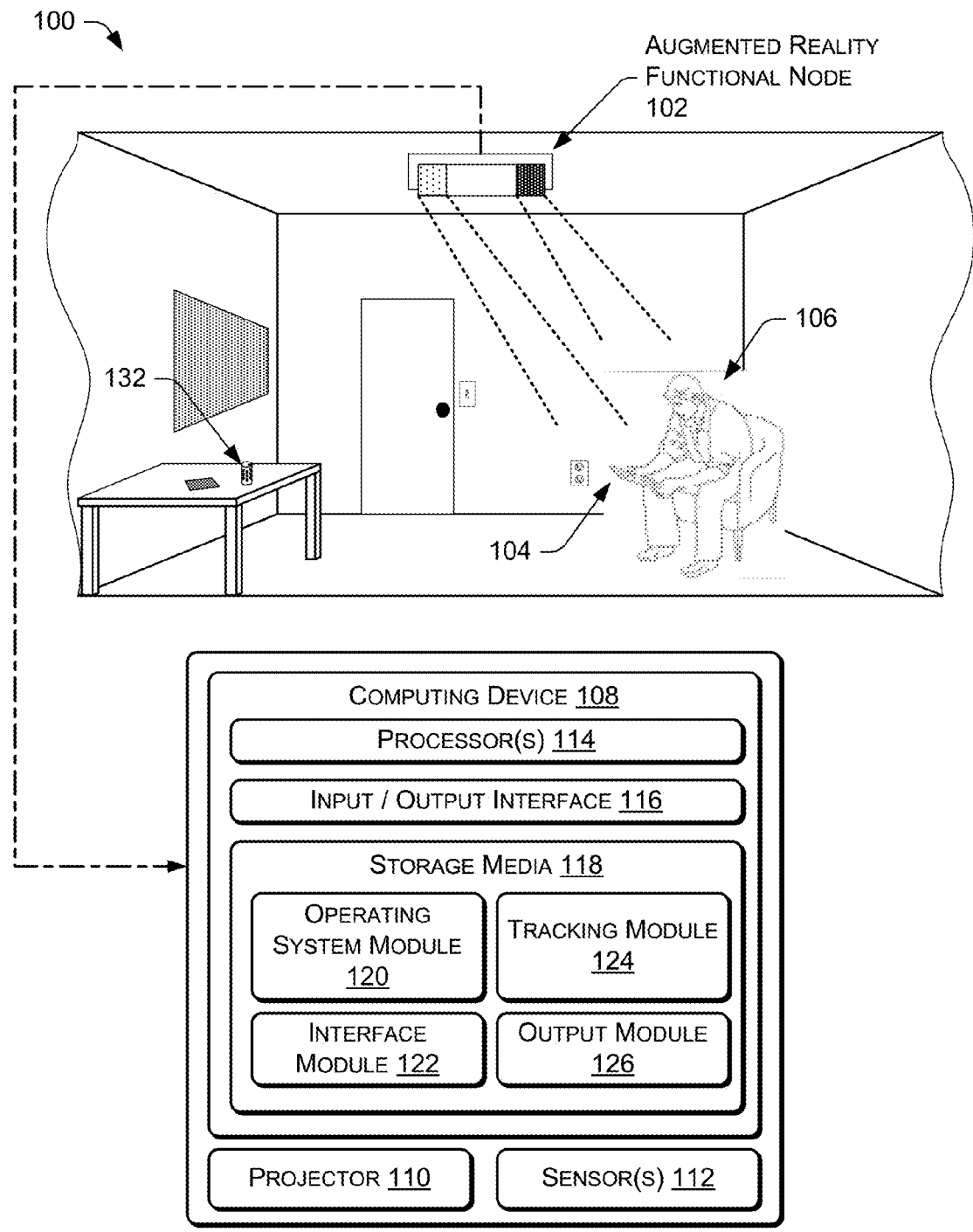
FIG. 1 shows an illustrative augmented reality functional node (ARFN) configured to perform the techniques described herein for projecting images into an augmented reality environment.

FIG. 1 shows an illustrative augmented reality environment 100 that includes an augmented reality functional node (ARFN) 102 configured to perform the techniques described herein. When active, the ARFN node 102 may project content onto any surface within the environment 100, such as a portable display medium 104, thereby generating an augmented reality environment that may incorporate real-world objects within the environment 100. The projected content may include electronic books, videos, images, interactive menus, or any other sort of visual and/or audible content. The ARFN node 102 scans the environment 100 to determine the presence of any objects, such a user 106 within the environment 100, and can project content 104, such as an image, on any surface.

As illustrated, the ARFN node 102 comprises a computing device 108, a projector 110, and one or more sensor(s) 112. Some or the all of the computing device 108 may reside within a housing of the ARFN node 102 or may reside at another location that is operatively connected to the ARFN node 102. The computing device 108 comprises one or more processor(s) 114, an input/output interface 116, and storage media 118. The processor(s) 114 may be configured to execute instructions that may be stored in the storage media 118 or in other storage media accessible to the processor(s) 114.

As illustrated, the user 106 holds a portable display medium 104, onto which the projector 110 may project content for consumption by the user 106. The sensor(s) 112 of the ARFN node 102 may capture images for detecting a location and orientation or the medium 104 for the purpose of instructing the projector where to project the content within the environment, as well as to focus the projection when the images projected onto the portable display medium become out of focus due to the shifting of the display medium in the user's hands.

The input/output interface 116, meanwhile, may be configured to couple the computing device 108 to other components of the ARFN node 102, such as the projector 110, the sensor(s) 112, other ARFN nodes 102 (such as in other environments or in the environment 100), other computing devices, sirens, network communication devices (such as modems, routers, and wireless transmitters), a conventional security system, and so forth. The coupling between the computing device 108 and other devices may be via wire, fiber optic cable, wireless connection, or the like. The sensors may include, in various embodiments, one or more image sensors such as one or more cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, and pressure sensors. Other sensor types and sensed attributes may be utilized without departing from the scope of the present disclosure.

The storage media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory, or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 108. The storage media 118 may reside within a housing of the ARFN, on one or more storage devices accessible on a local network, on cloud storage accessible via a wide area network, or in any other accessible location.

The storage media 118 may store several modules, such as instructions, datastores, and so forth that are configured to execute on the processor(s) 114. For instance, the storage media 118 may store an operating system module 120, an interface module 122, a tracking module 124, and an output module 126.

The operating system module 120 may be configured to manage hardware and services within and coupled to the computing device 108 for the benefit of other modules. The interface module 122, meanwhile, may be configured to receive and interpret commands received from users within the environment 100. For instance, the interface module 122 may analyze and parse images captured by one or more cameras of the sensor(s) 112 to identify users within the environment 100 and to identify gestures made by users within the environment 100, such as gesture commands to project display content. In other instances, the interface module 122 identifies commands audibly issued by users within the environment and captured by one or more microphones of the sensor(s) 112. In still other instances, the interface module 122 allows users to interface and interact with the ARFN node 102 in any way, such as via physical controls, and the like.

The tracking module 124, meanwhile, may be configured to track the portable display medium 104 through the environment 100. For example, in instances where the user 106 carries the portable display medium 104 through the environment for receiving projected content, the tracking module 124 may track the location (e.g., in three space) and orientation of the display medium within the environment. The output module 126, meanwhile, may be configured to receive this information from the tracking module 124, determine where to project content based on this information, and periodically or continuously determine how to focus the projector 110 based on the location and orientation of the display medium. For instance, and as described in detail below, the output module 126 may determine how to focus a projected image on a display medium as the user 106 moves the display medium through the environment 100.

The tracking module 124 may track the location and orientation of the portable display medium 104 using any type of depth-sensing technique. For instance, the projector may project a structured light pattern in the environment, and the camera may capture distortion in the structured light due to objects in the environment, such as the portable display medium. The system may then analyze this distortion to determine objects within the environment, as well as the locations and orientations of these objects. Of course, while one example is provided, it is to be appreciated that the tracking module 124 may track the portable display medium using any type of depth-sensing technique, such as time-of-flight or the like.

Example ARFN

Figure 2:
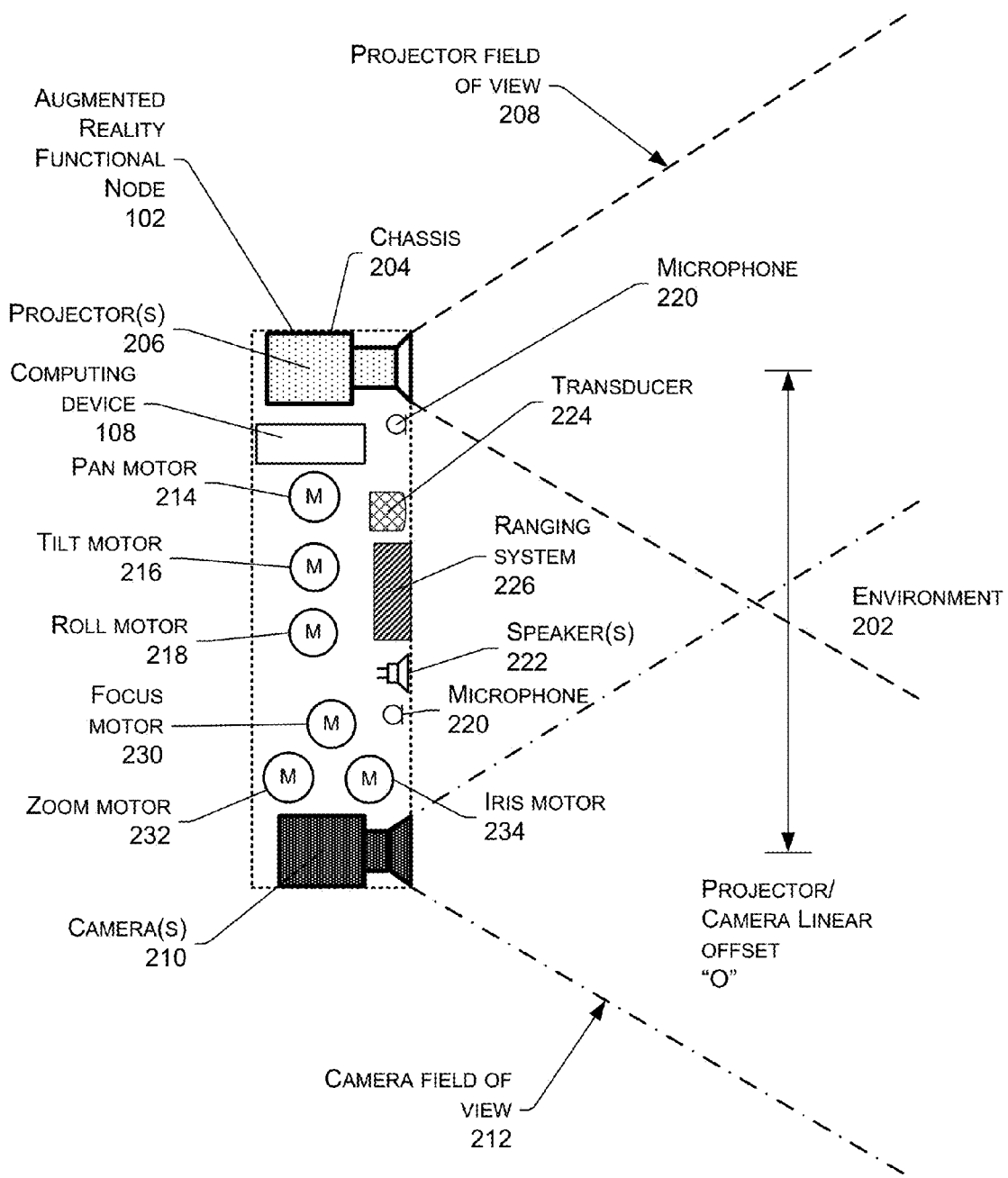
FIG. 2 shows additional details of an example ARFN that may be configured to provide a projected image.

FIG. 2 shows additional details of an exemplary ARFN node 102 that may be configured as described above with reference to FIG. 1. The ARFN node 102 is configured to scan at least a portion of an environment 202 and the objects therein to detect and identify, such as the location and orientation of a portable display medium as a user moves the medium through the environment. The ARFN node 102 may also be configured to provide augmented reality output, such as images, sounds, and so forth.

A chassis 204 holds the components of the ARFN node 102. One or more projector(s) 206 may be disposed within the chassis 204 and may be configured to generate and project light and/or images into the environment 202. These images may be visible light images perceptible to an object, visible light images imperceptible to the object, images with non-visible light, or a combination thereof. This projector(s) 306 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector(s) 206 has a projector field of view 308 which describes a particular solid angle. The projector field of view 208 may vary according to changes in the configuration of the projector. For example, the projector field of view 208 may narrow upon application of an optical zoom to the projector.

In some implementations, the ARFN node 102 may instruct devices that are separate from, but at least partially controllable by, the ARFN node 102 to visually or audibly output content. For instance, the ARFN node 102 may instruct a television or other display device within the environment to output a particular piece of visual content. Or, the ARFN node 102 may instruct stereo speakers within the environment to output certain audible content. In these instances, the projector(s) 206 may project non-visible structured light (or other types of light for sensing objects and objects and/or for sensing movement within the environment), while utilizing other output devices within the environment to output requested content, including content associated with one or more security actions such as but not limited to augmented reality security measures as described elsewhere within this Detailed Description. Of course, in other instances the projector(s) 206 may be used instead of or in addition to the existing output devices within the environment.

One or more camera(s) 210 may also be disposed within the chassis 204. The camera(s) 210 is configured to image the environment 202 in visible light wavelengths, non-visible light wavelengths, or both. The camera(s) 210 has a camera field of view 212 that describes a particular solid angle. The camera field of view 212 may vary according to changes in the configuration of the camera(s) 210. For example, an optical zoom of the camera may narrow the camera field of view 212.

In some implementations, a plurality of camera(s) 210 may be used. For instance, one embodiment of the ARFN node 102 may include a three-dimensional (3D), infrared (IR) camera and a red-green-blue (RGB) camera. The 3D, IR camera may be configured to capture information for detecting depths of objects within the environment 202, while the RGB camera may be configured to detect edges of objects by identifying changes in color within the environment 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector(s) 206 and/or the camera(s) 210. For example, in one implementation the actuator may comprise a pan motor 214, a tilt motor 216, and so forth. The pan motor 214 is configured to rotate the chassis 204 in a yawing motion. The tilt motor 216, meanwhile, is configured to change the pitch of the chassis 204. In some instances, the ARFN additionally or alternatively includes a roll motor 218, which allows the chassis 204 to move in a rolling motion. By panning, tilting, and/or rolling the chassis 204, different views of the environment 202 may be acquired. Thus, the ARFN node 102 is mobile and the projected image from projector 206 will be effected by motion of the node 102.

One or more microphones 220 may be disposed within the chassis 204, or elsewhere within the environment 202. These microphones 220 may be used to acquire input from an object, for echolocation, location determination of a sound, or to otherwise aid in the characterization of and receipt of input from the environment 202. For example, an object may make a particular noise, such as a cough, a throat clear, a tap on a wall, or snap of the fingers, which are pre-designated as attention command inputs or as object detection noises. Such audio inputs may be located within the environment using time-of-arrival differences among multiple microphones and used to summon an active zone within the augmented reality environment or identify a location of the object, and can be to discern acoustic information from a surface. One or more speaker(s) 222 may also be present to provide for audible output, such as music, text-to-speech or the like.

A transducer 224 may be present within the ARFN node 102, or elsewhere within the environment, and may be configured to detect and/or generate inaudible signals, such as infrasound or ultrasound. These inaudible signals may be used to provide for signaling between accessory devices and the ARFN node 102.

The ARFN node 102 may also include a ranging system 226. The ranging system 226 is configured to provide distance information from the ARFN node 102 to a scanned object, or other objects within the environment. The ranging system 226 may comprise radar, light detection and ranging (LIDAR), ultrasonic ranging, stereoscopic ranging, and so forth. In some implementations the transducer 224, the microphones 220, the speaker(s) 222, or a combination thereof may be configured to use echolocation or echo-ranging to determine distance and spatial characteristics of an object.

In this illustration, the computing device 108 is shown within the chassis 204. However, in other implementations all or a portion of the computing device 108 may be disposed in another location and coupled to the ARFN node 102. This coupling may occur via wire, fiber optic cable, wirelessly, or a combination thereof. Furthermore, additional resources external to the ARFN node 102 may be accessed, such as resources in another ARFN node 102 accessible via a local area network, cloud resources accessible via a wide area network connection, or a combination thereof.

Also shown in this illustration is a projector/camera linear offset designated "O". This is a linear distance between the projector(s) 206 and the camera(s) 210. Placement of the projector(s) 206 and the camera(s) 210 at distance "O" from one another may aid in the recovery of structured or other light data from the environment. The known projector/camera linear offset "O" may also be used to calculate distances, dimensioning, and otherwise aid in the characterization of objects within the environment 202. In other implementations the relative angle and size of the projector field of view 208 and camera field of view 212 may vary. Also, the angle of the projector(s) 206 and the camera(s) 210 relative to the chassis 204 may vary.

Further illustrated in the embodiment of the node 102 in FIG. 2 are the focus controls motors, shown here as focus motion 230, zoom motor 232 and iris motor 234. Each of the motors can therefore either directly or indirectly control the focus of the image. The focus motor 230 can thus directly control the focus of the image camera 210 projects. The zoom motor 232 will zoom the image in an appropriate direction which can indirectly affect the focus of the projected image. The iris motor 234 adjusts the amount of light being projected and thereby also indirectly affects the focus of the image.

It should further be noted that the tilt motor 216, pan motor 214 and roll motor 218 can likewise adjust the position of the node 102 to cause the projected image to change in relation to the surface upon which the image is projected, such as portable display medium 104 in FIG. 1. Other motors can be used in the present node to adjust attributes of the camera 210 or node 102 to otherwise directly or indirectly adjust the focus of the projected image.

In other implementations, the components of the ARFN node 102 may be distributed in one or more locations within the environment 100. As mentioned above, microphones 220 and speaker(s) 222 may be distributed throughout the environment. The projector(s) 206 and the camera(s) 210 may also be located in separate chasses 204. The ARFN node 102 may also include discrete portable signaling devices used by objects to issue command attention inputs.

For example, these may be acoustic clickers (audible or ultrasonic), electronic signaling devices such as infrared emitters, radio transmitters, and so forth.

The ARFN node 102 is shown in FIG. 2 with various sensors, but other sensors may be located either within or external to the chassis 204. The sensors may include, in various embodiments, cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, pressure sensors, and so forth.

Figure 3:
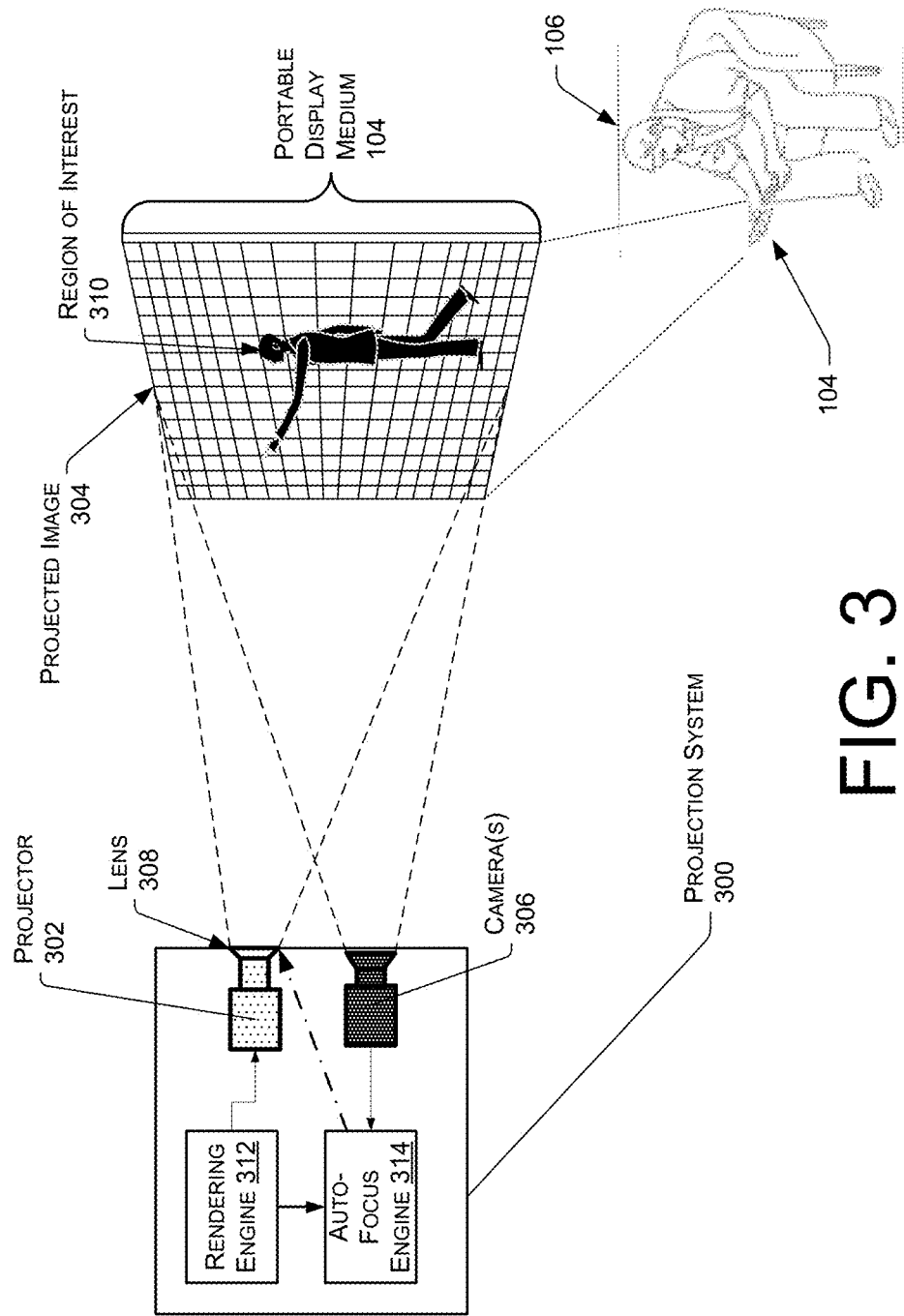
FIG. 3 is an illustrative diagram of one embodiment of a projection system that autofocuses the projected image based on the monitoring of a specific region of interest.

FIG. 3 is an illustrative diagram of one embodiment of a projection system 300 that autofocuses a series of projected images based on a distance and/or orientation of a display changing relative to a projector that projects the images. For instance, FIG. 3 illustrates a projector projecting content onto the portable display medium 104 being held by the user 106. Because the user may move the medium 104 when consuming the content, the location and/or orientation of the medium relative to the projector may change, thus necessitating a change in focus of a lens of the projector to maintain image quality and viewing consistency for the user 106. As described below, the techniques may continuously or periodically autofocus the project based on the monitoring of a specific region of interest 310. This region of interest may be defined as a portion of series of images (e.g., a video) that has a relatively large degree of contrast around the edges and that changes very little over a series of frames. Given the contrast and static nature of such a region, the system may be able to accurately identify any changes in image quality due to an out-of-focus projection (due to changes in the location or orientation of the medium 104).

In this instant illustration, the projector 302 projects a projected image 304 onto the display medium 104. In some implementations a sequence of different projected images 304 may be used (e.g., a series of frames that collectively define a video). The distance orientation of the surface 104 relative to the projector 302 may change as the projector projects the image(s) 304 onto the surface 104 and, therefore, the focus of the projector 302 may need to dynamically change. As described above, this position and orientation of the surface 104 relative to the projector may be determined in any number of ways, such as via structured light, LIDAR, time-of-flight techniques or the like.

For illustrative purposes, a person is the region of interest 310 and is shown within the projected image 304. That is, this region of interest 310 may represent a portion of the sequence of images that does not change greatly over a period of time (i.e., has little motion) and that has a relatively large contrast around its edges. In this embodiment, the source image data to be projected (e.g., the video to be projected) is provided to an auto-focus engine 314 and is used to reference image data to initially determine what will constitute the region of interest, such as the person as the region of interest 310. In other words, the auto-focus engine 314 will predict, through motion analysis of the source image data, that the person in the projected image 304 is does not move in the images over a sequence of frames. The rendering engine 312 provides input from the image source (which can be raw buffer or motion vector information from video) going through projector 302 to the auto-focus engine 314, which can then be synchronized with a frame sync pulse from the projector 302 to effect refocus of the region of interest 310, if necessary. The camera 306 will monitor such attributes as sharpness, contract, brightness, etc., of the projected image 304 and interact with the projector 302 to start focusing the image through adjustable lens 308.

As the projected image 304 is refocused, the camera 306 can also then capture the region of interest 310 attributes again and relays them to the auto focus engine 314 to determine if the refocusing is making the region of interest better for viewing. As described in more detailed below, a threshold of an attribute is predetermined, such as a specific level of sharpness or contrast, and the refocusing of the image is done based upon the threshold. If the region of interest 310 is distorted by the surface 104 having imperfections therein, or through the surface 104 being at a non-substantially-orthogonal relation to the projector 302, a baseline can be set at the first few frames of content display such that auto-focus engine 314 can account for the baseline distortion in focusing the projected image 304.

Further, the autofocusing can occur from either directly adjusting the focus of the image 304, such as adjusting lens 308, or can also occur through indirect methods, such as zooming the image (such as with zoom motor 232 in FIG. 2), adjusting the amount of light being projected (such as with iris motion 234), or by adjusting the positioning of the projector 302. These adjustments can be made at the same time, or separately. Any methods of directly or indirectly affecting the focus of the projected image 304 known to one of skill in the art can be utilized in the projection system 300 to assist in optimally focusing the projected image 304.

Figure 4:
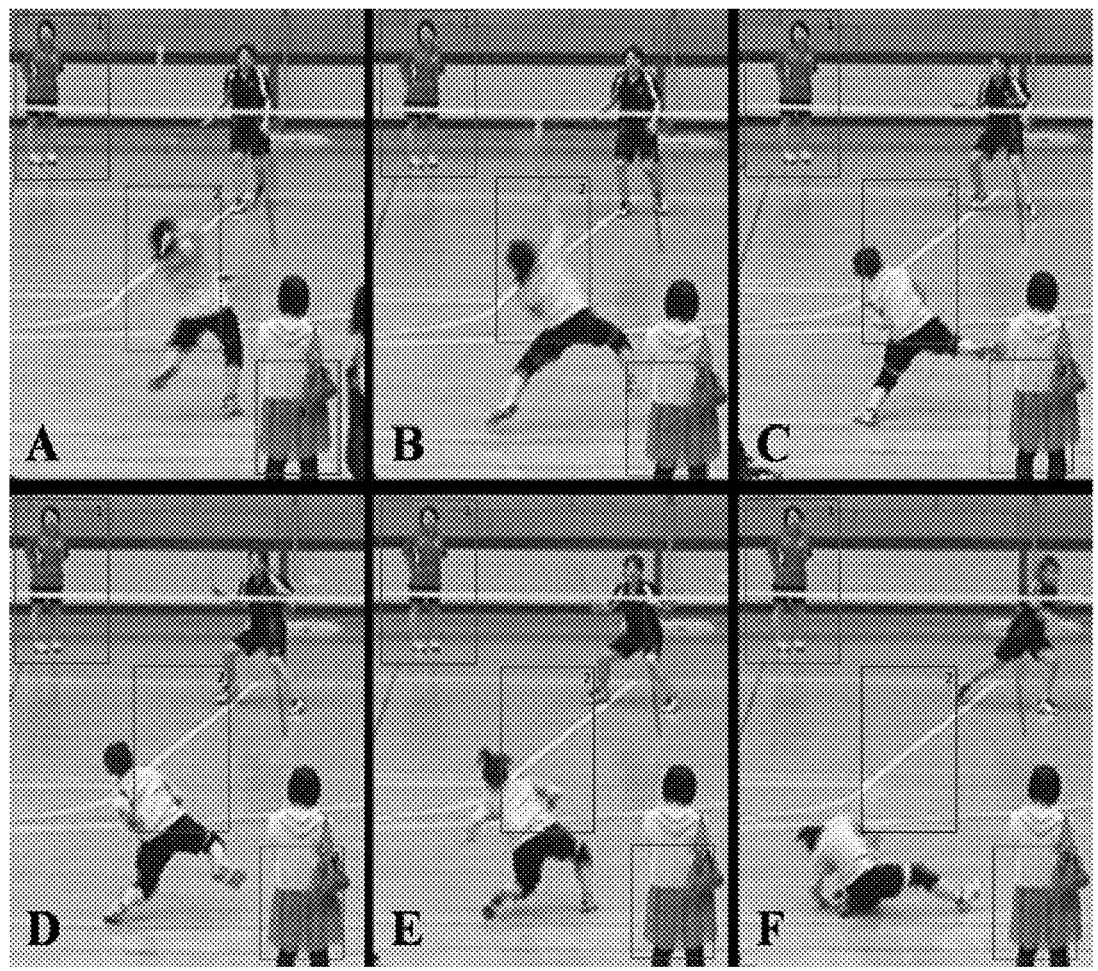
FIG. 4 is a series of projected images in which specific regions of the image that are likely not to be in motion are identified and specifically monitored.

FIG. 4 represents a series of images that collectively form a portion of a video that may be projected onto a portable display medium. Using the techniques described above, regions of these images having a relatively high contrast may be identified for the potential use of monitoring these regions over time to determine whether the projector should be re-focused.

FIG. 4 illustrates a series of projected images A-F in which specific regions 1-3 of the image that have high contrast therein and, therefore, may be monitored for purposes of autofocusing. In this video sequence, a predefined number of consecutive frames A-F are captured either via image data processing on the incoming video stream or through the camera sensing the live display (e.g., frame by frame), and the data is processed to determine a region of interest for monitoring and potential refocusing. The first image A is used as a background image and the potential areas of interest are identified, here area 1, 2, and 3. The most ideal regions are selected here based on the contrast score versus the initial background. In the frame A, each selected regions 1, 2 and 3 are compared for significant change in contrast/scenery and thus stand out from the background. Then significant motion changes are noted within the selected regions as the frame rate progresses, and the same steps are repeated for B, C, D and E to create, for instance, a 5 frame sample.

At the end of the sampling period, the algorithm is able to determine which regions remain mostly consistent, e.g. 1 and 3, and which is in motion, e.g. frame 2. The contrast score or sharpness algorithm is then run on the regions having the high contrast and yet do not include a great degree of motion. Here, region 2 can be may be discarded given its large degree of motion through the sequence, while region 1 & 3 are used to determine whether the projector should be refocused. In such an embodiment, the final focus score is used as input to determine if the image is in focus.

If focusing is needed based upon the algorithm used, the lens 308 in FIG. 3 will adjust the image, and the same steps are repeated until a convergence is realized and the threshold values of contrast and sharpness are reached. It should be further noted that the number of potential regions of interest is not limited and other algorithms can be used to determine when the image is out of focus.

Example Processes

Figure 5:
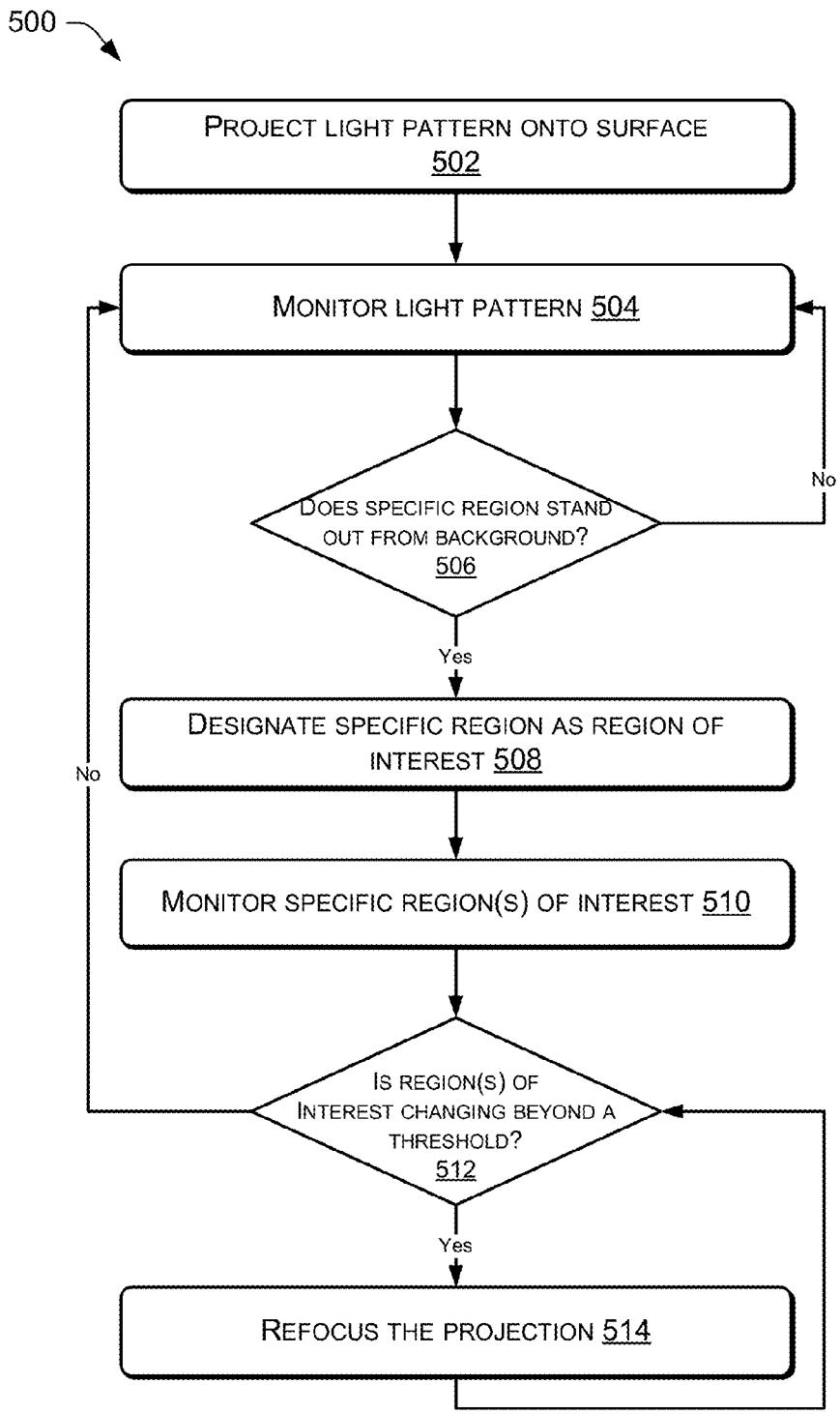
FIG. 5 is an illustrative flow diagram of one embodiment of the projection autofocus process that determines one or more regions of interest based upon the motion detected within the projected image.

FIG. 5 is an illustrative flow diagram of one embodiment of the projection autofocus process 500 that determines one or more regions of interest based upon the motion detected within the projected image. At step 502, a light pattern representing a series of one or more images (such as projected image 304 in FIG. 3) is projected onto a surface (such as the display medium 104). At step 504, the light pattern is monitored. For example, frames A-F can initially monitored as shown in FIG. 4. Then a determination is made as to whether one or more specific regions of the image stand out from the background and include an amount of motion that is less than a threshold, as shown at decision 506.

If no specific regions of interest are identified at decision 506, then the process iterates to again monitor the light pattern at step 504. For example, if no regions of interest existed in the first 5 frames because there was not sufficient contrast or because each region having a sufficiently high contrast contained too much motion, then the process iterates to monitor the next 5 frames. If one or more regions of interest can be identified at decision 506, then the specific region is identified as a specific region of interest for the next monitoring period, as shown at step 508, and is then monitored throughout the next monitoring period as shown at step 510, e.g. the next 5 frames.

A determination is then made as to whether the monitored region(s) of interest is changing beyond a predetermined threshold, as shown at decision 512. The predetermined threshold can be a minimum level of sharpness, contrast, or any other attribute indicative of the focus of the image. If the region(s) of interest have not changed beyond the threshold in decision 512, then the process iterates to again monitor the light pattern at decision 504. Otherwise, if the region(s) of interest has changed at decision 512, then the projection is refocused as shown at step 514 and the process iterates at decision 512 until the one or more regions of interest are in adequate focus again.

Figure 6:
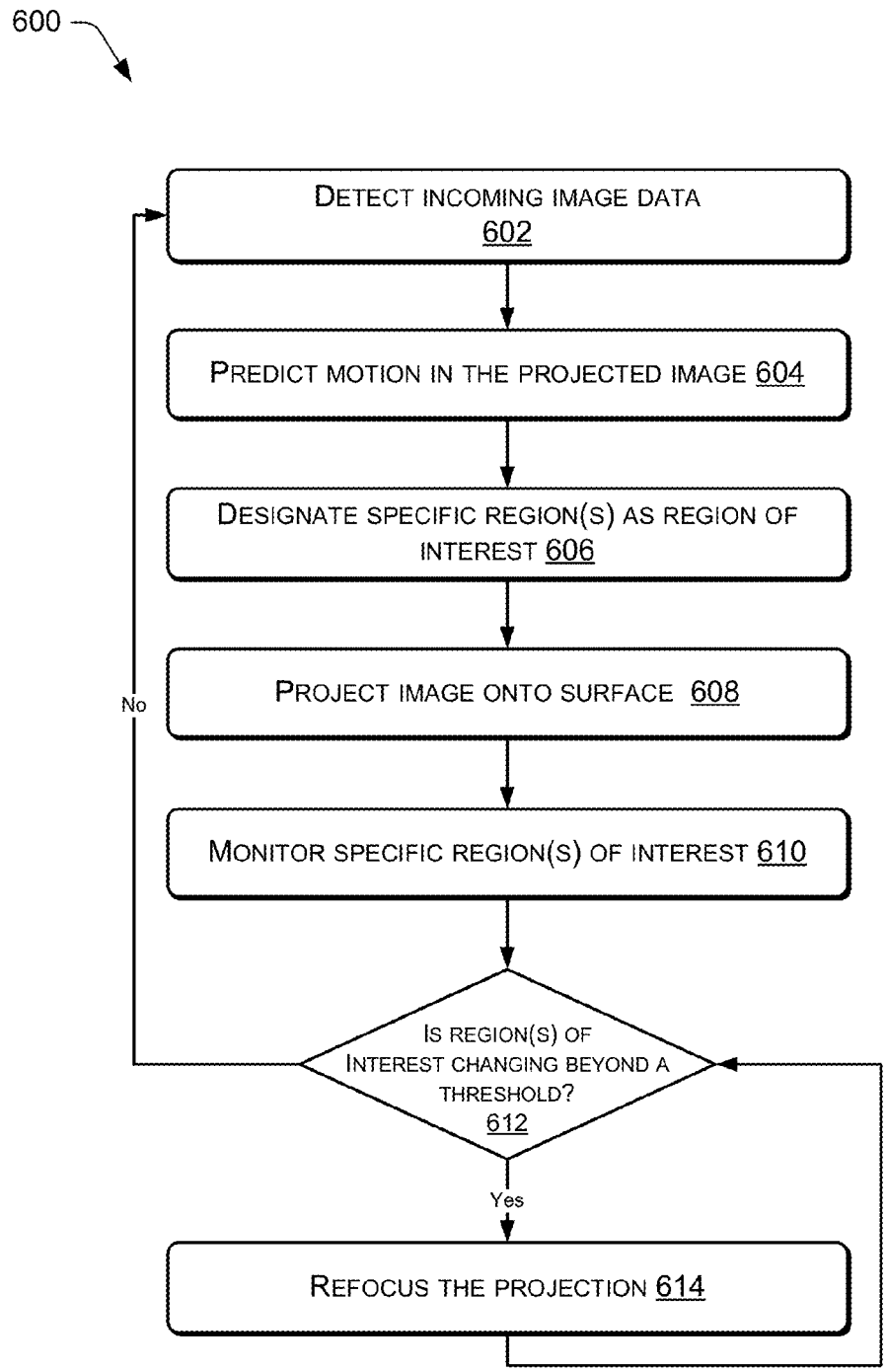
FIG. 6 is an illustrative flow diagram of one embodiment of the projection autofocus process that determines one or more regions of interest based upon motion prediction within the image data that is to be projected.

FIG. 6 is an illustrative flow diagram of one embodiment of the projection autofocus process 600 that determines the region of interest based upon motion prediction based upon the image data that is to be projected. This process can be performed by the projection system 300 in FIG. 3 with the rendering engine 312 and auto-focusing engine 314. The incoming image data is detected as shown at step 602 and, as in the example in FIG. 3, the rendering engine 312 will send the incoming image data to the autofocus engine 314. Thereafter, motion within the image data is that is to be projected is determined, as shown at step 604.

Once the motion is predicted within the image at step 604, one or more region of interest are designated as shown at step 606. As described above, these region(s) of interest comprise those regions having a sufficiently high level of contrast and yet include little motion over a number of frames. After identifying the regions of interest, the image data is projected on the surface (such as on the display medium 104 in FIG. 3) as shown at step 608. The region(s) of interest in the projected image are then monitored as shown at step 610. Thus, with reference to the projection system 300 of FIG. 3, the camera 306 will monitor the projected image 304 and regions of interest (such as regions 1-3 of images A-F in FIG. 4), and such monitoring will typically occur for a set period of frames as has been described herein.

After the monitoring period is complete at step 610, then a determination is made as to whether the monitored region(s) of interest is changing beyond a predetermined threshold, as shown at decision 612. The predetermined threshold can be a minimum level of sharpness, contrast, or any other attribute indicative of the focus of the image. If the region(s) of interest have not changed beyond the threshold in decision 612, then the process iterates to again detect the incoming image data at step 602 and start to generate the region(s) of interest for monitoring. Otherwise, if the region(s) of interest has changed at decision 612, then the projection is refocused as shown at step 614 and the process iterates at decision 612 until the one or more regions of interest are in adequate focus again.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   a camera;
   a projector; and
   one or more non-transitory computer-readable storage media storing computer-executable instructions that are executable by the one or more processors to cause the one or more processors to:
      cause the projector to project an image on a surface;
      capture image information of the image, the image information representative of one or more objects within the image;
      determine motion information associated with the image based at least in part on the image information;
      determine, based at least in part upon the motion information, a region in the image for monitoring;
      detect that a change in an image attribute associated with the region meets or exceeds a first threshold; and
      adjust a focus parameter of the projector and project the image on the surface using the focus parameter, the focus parameter including at least one of a position setting or a motor setting of the projector.

2. The system of claim 1, wherein the instructions are further executable to:
   determine the region in the image based at least in part upon review of data captured by one or more sensors and associated with the surface.

3. The system of claim 2, wherein the instructions are further executable to:
   determine estimated motion for an object of the one or more objects depicted in the image based upon image data associated with the image; and
   determine the region based at least in part upon the estimated motion.

4. The system of claim 1, wherein the instructions are further executable to:
   project a plurality of images on the surface, the plurality of images including the image;
   determine motion of an object of the one or more objects within the region of each of the plurality of images;

determine that an amount of the motion is less than a second threshold; and determine the region, based at least in part upon the amount of the motion being less than the second threshold.

5. The system of claim 1, wherein the instructions are further executable to, after adjusting the focus parameter:

change the first threshold to a third threshold for the region.

6. The system of claim 1, wherein the instructions are further executable to, after adjusting the focus parameter:

change a frequency of monitoring the region.

7. The system of claim 1, wherein the instructions are further executable to:

determine that the image is distorted by the surface;

establish a baseline distortion of the image;

establish a second threshold based at least in part on the baseline distortion; and detect that a second change in the image attribute associated with the region meets or exceeds the second threshold.

8. A method comprising:

under control of one or more computer systems configured with executable instructions;

projecting an image on a surface;

capturing data associated with the image;

selecting a region associated with the image to be monitored;

detecting a change in an image attribute of the image within the region, the change greater than a threshold associated with the image attribute; and adjusting a focus of a projector based at least in part on the threshold being met or exceeded.

9. The method of claim 8, further comprising:

adjusting the threshold based at least in part on the adjusting of the focus of the projector.

10. The method of claim 8, further comprising:

monitoring the region at periodic time intervals.

11. The method of claim 8, further comprising:

determining that the projected image is distorted by an amount; and adjusting the threshold based at least in part on the amount.

12. The method of claim 8, further comprising:

changing a time interval associated with periodic monitoring of the region.

13. The system of claim 8, further comprising:

projecting a light pattern on the surface; and determining the region based at least in part on data captured by one or more sensors associated with the light pattern projected on the surface.

14. A computing device comprising:

one or more processors;

a sensor to capture image data;

a projector to project an image onto a surface; and one or more non-transitory computer-readable storage media storing computer-executable instructions that are executable by the one or more processors to cause the one or more processors to:

determine, from the image data, a region in the image that is to be monitored; and adjust an attribute of the image based at least in part on detecting a reduction in image quality greater than or equal to the threshold.

15. The computing device of claim 14, wherein the surface is a portable display medium and the instructions are further executable to:

track a movement of the portable display medium; and cause the projector to continually project the image on the portable display medium.

16. The computing device of claim 15, further comprising adjust a focus parameter of the projector to adjust the attribute, the focus parameter including at least one of a position setting or a motor setting of the projector.

17. The computing device of claim 16, wherein the instructions are further executable to:

cause the sensor to capture the image data at periodic intervals.

18. The computing device of claim 14, wherein the instructions are further executable to:

cause the projector to project a light pattern on the surface; and determine the region based at least in part upon analyzing image data associated with the light pattern.

19. The computing device of claim 14, wherein the sensor includes at least one of:

one or more image sensors;

one or more cameras;

one or more microphones;

one or more ultrasound transducers;

one or more heat sensors;

one or more motion detectors; or one or more depth sensing cameras.

20. The computing device of claim 14, wherein the instructions are further executable to:

adjust the threshold based at least in part on the adjusting the attribute.

* * * * *